United States Patent [19]

Kotaki et al.

[11] Patent Number: 5,781,368
[45] Date of Patent: Jul. 14, 1998

[54] MAGNETIC TAPE DEVICE AND AUTOMATIC CLEANING METHOD FOR USE IN THE SAME

[75] Inventors: Yoshio Kotaki; Yukio Katou, both of Kawasaki, Japan

[73] Assignee: Fujitsu Limited, Kawasaki, Japan

[21] Appl. No.: 774,436

[22] Filed: Dec. 30, 1996

Related U.S. Application Data

[63] Continuation of Ser. No. 603,507, Feb. 20, 1996, abandoned, which is a continuation of Ser. No. 276,533, Jul. 18, 1994, abandoned.

[30] Foreign Application Priority Data

Jul. 28, 1993 [JP] Japan ................................. 5-185705

[51] Int. Cl.$^6$ ........................................ G11B 15/68
[52] U.S. Cl. ................. 360/92; 369/36; 369/178
[58] Field of Search ..................... 360/92, 128, 137; 369/34, 178, 35, 191, 36, 38; 206/387.1, 387.12, 387.13, 387.14, 387.15

[56] References Cited

U.S. PATENT DOCUMENTS

| | | |
|---|---|---|
| 4,839,764 | 6/1989 | Ikedo et al. ................... 360/98.08 |
| 5,012,922 | 5/1991 | Nehl ................................ 206/387 |
| 5,337,297 | 8/1994 | Kvifte et al. .................... 369/36 |

FOREIGN PATENT DOCUMENTS

| | | | |
|---|---|---|---|
| 2014242 | 10/1990 | Canada . | |
| 3925902 | 3/1990 | Germany | ................ 360/137 |
| 4172618 | 6/1992 | Japan . | |
| 0620234 | 1/1994 | Japan | ................ 360/128 |

*Primary Examiner*—Stuart S. Levy
*Assistant Examiner*—William J. Klimowicz

[57] ABSTRACT

A magnetic tape device allowing efficient use of space and storage capacity having a cartridge auto loader for taking out cartridges which are stored in a magnetic tape device. The magnetic tape device includes a housing, a door, a magazine tray slidable relative to a bottom portion of the housing, a cleaning cell for receiving a cleaning cartridge, a carrier portion for transferring the cartridge among the magazine, the main body, and the cleaning cell, and an elevator portion for moving the carrier portion. The magnetic tape device allows automatic cartridge insertion and removal while keeping the magazine stationary.

13 Claims, 17 Drawing Sheets

Fig. 5A
Fig. 5B
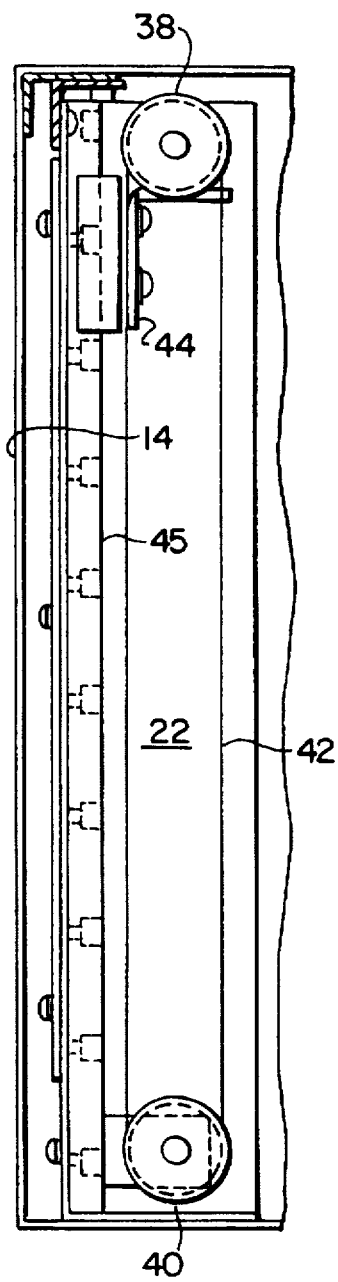
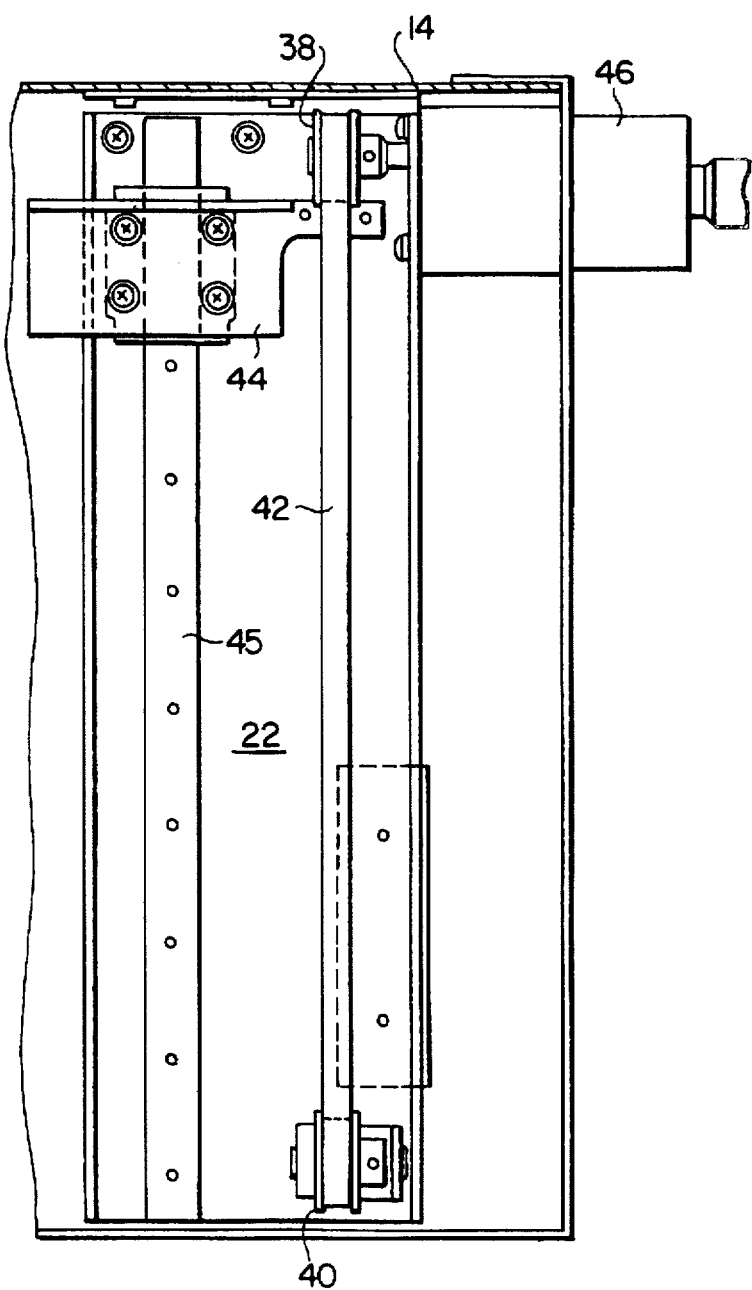

MAGNETIC TAPE DEVICE AND AUTOMATIC CLEANING METHOD FOR USE IN THE SAME

This application is a continuation of application Ser. No. 08/603,507, filed Feb. 20, 1996, now abandoned, which was a continuation of Ser. No. 08/276,533, filed Jul. 18, 1994, now abandoned.

BACKGROUND OF THE INVENTION

This invention relates generally to magnetic tape devices. This invention relates specifically to magnetic tape devices having a cartridge auto loader for taking out one of a plurality of cartridges stored in a magazine and introducing the cartridge which is taken out to a main body of the magnetic tape device.

In modern computer related devices, increase of memory capacity in magnetic storage is generally desirable. For example, a magnetic device which is capable of consecutively processing a plurality of magnetic tape cartridges, taking advantage of the features of the magnetic tape cartridge as a commutative recording medium is useful to accomplish increased memory capacity. Reliability, cost, and effectiveness of such a device could be enhanced by a cartridge auto loader which is excellent in operability and which is compact.

FIG. 1 is a perspective view showing one example of a conventional magnetic tape device 1 equipped with a cartridge auto loader 2. During use, the cartridge loader 2 is mounted on a front surface of a main body of the magnetic tape device. A plurality of magnetic cartridges 6 (seven, for example) are removably housed in a magazine 8.

The cartridge auto loader 2 includes elevator portions 9 for moving the magazine 8 upwardly and downwardly, a feed mechanism portion (within the cartridge loader 2) for inserting the cartridges 6 stored in the magazine 8 into the main body 4, a circuit portion (not shown) for controlling various parts, and an operation panel for the operator.

In such a conventional magnetic tape device equipped with a cartridge auto loader, head cleaning of heads in the main body is performed by a cleaning tape which is placed in the magazine by an operator when an alarm lamp of the main body indicates the necessity of head cleaning or when a periodical inspection is made. The necessity of operator involvement for the head cleaning operation may render efficiency of use of the magnetic tape device low.

To facilitate automatic head cleaning in such a conventional device, head cleaning may be carried out in the following manner. One slot of the magazine is reserved for the cleaning tape and the cleaning tape is normally stored in the slot. Thus the cleaning tape can be loaded on the device without operator involvement. However, in this case, storage capacity is adversely affected since one slot of each magazine must be reserved for a cleaning tape. As a result, of a dedicated cleaning slot use efficiency of the magazine is low.

Additionally, since the conventional cartridge auto loader has a construction in which the magazine is moved upwardly and downwardly, it has a problem that in the device may not be suitable to fulfill the demands of "space saving". For example, in the case where a plurality of magnetic tape devices are housed in racks, it is necessary to provide enough space for the magazine to move upwardly and downwardly. Thus, vertical spacing between racks housing magnetic tape devices must be substantial to accommodate movement of the magazine. Therefore, efficiency for mounting the devices in the racks is poor.

It is therefore an object of the present invention to provide a magnetic tape device in which head cleaning can be automatically and efficiently made in a main body of the device.

Another object of the present invention is to provide a magnetic tape device which is suitable to fulfill demands relating to reducing space (space saving) through elimination of the need to take into consideration the vertical movement (upward and downward movement) of the magazine.

A further object of the present invention is to provide an automatic cleaning method for use in a magnetic tape device.

According to the present invention, there is provided a magnetic tape device having a cartridge auto loader for taking out a selected cartridge from a plurality of cartridges which are stored in a magazine and introducing the selected cartridge into a main body of the magnetic tape device, the magnetic tape device including a housing located external from and adjacent to the main body; a door which can be opened and closed relative to the housing; a magazine tray having a tray portion on which the magazine is placed, the magazine tray being slidable relative to a bottom portion of the housing between a first position where the tray portion is inside the housing and a second position where the tray portion is outside the housing when the door is open; a cleaning cell for receiving a cleaning cartridge used for cleaning a recording/reproducing head of the main body; a carrier portion for transferring the cartridge among the magazine placed on the magazine tray which is in the first position, the main body and the cleaning cell; and an elevator portion for moving the carrier portion in a stacking-up direction of the cartridges in the magazine.

According to a preferred embodiment of the present invention, the stacking-up direction of the cartridges in the magazine is vertical.

According to another aspect of the invention, there is also provided an automatic cleaning method for use in a magnetic tape device having a cartridge auto loader for taking out a selected cartridge from a plurality of cartridges which are stored in a magazine tape device, the magnetic tape device including a housing located external from and adjacent to the main body; a door which can be opened and closed relative to the housing; a magazine tray having a tray portion on which magazine is placed, the magazine tray being slidable relative to a bottom portion of the housing between a first position where the tray portion is inside the housing and a second position where the tray portion is outside the housing when the door is open; a cleaning cell for receiving a cleaning cartridge used for cleaning a recording/reproducing head of the main body; a carrier portion for transferring the cartridge among the magazine placed on the magazine tray which is in the first position, the main body and the cleaning cell; and an elevator portion for moving the carrier portion in a stacking-up direction of the cartridges in the magazine, the automatic cleaning method comprising a first step of moving the carrier portion to a position corresponding to the cleaning cell; a second step of moving the cleaning cartridge from the cleaning cell to the carrier portion; a third step of detecting the cleaning cartridge which has been discharged from the cleaning cell; a fourth step of moving the carrier portion to a position corresponding to a cartridge inlet port of the main body when the cleaning cartridge has been discharged from the cleaning cell; a fifth step of moving the cleaning cartridge from the carrier portion into the main body; a sixth step of judging whether or not the cleaning cartridge, which has been moved into the main body, is a regular one; a seventh step of executing the cleaning of the recording/reproducing head when the cleaning cartridge, which has been moved into the main body, is a regular one; an eighth step of moving the cleaning cartridge from inside the main body of the carrier body; a ninth step of moving the carrier portion to a position corresponding to the cleaning cell; a tenth step of moving the cleaning cartridge from the carrier portion to the cleaning cell; and an eleventh step of detecting the cleaning cartridge which has been received in the cleaning cell, an error report being sent to a host device when it is not detected in the third step that the cleaning cartridge has been discharged from the cleaning cell, or when it is judges in the sixth step that the cleaning cartridge, which has been moved into the main body, is not a regular one, or when it is not detected in the eleventh step that the cleaning cartridge has been received in the cleaning cell.

Since the magnetic tape device according to the present invention includes a cleaning cell, it is possible to normally stored the cleaning tape in the cleaning cell so that the cleaning tape can be loaded on the main body from the cleaning cell at a timing judged by the device whenever the head cleaning is required. This allows all of the slots of the magazine to be utilized for storage cartridges during normal operation.

Also, according to the magnetic tape device of the present invention, the carrier portion is moved in the stacking-up direction of the cartridges instead of moving the magazine upwardly and downwardly in order to permit an access to one of the plurality of cartridges stored in the magazine. This eliminates the need to provide additional space for the movement of the magazine. Accordingly, a cartridge auto loader suitable to fulfill the demands of "space saving" is provided.

According to a preferred embodiment of the present invention, the stacking-up direction of the cartridges in the magazine is vertical. In this case a cartridge inlet port (see FIG. 11) is formed horizontally in a front panel of the magnetic tape device.

BRIEF DESCRIPTION OF THE DRAWINGS

An embodiment of the present invention will be described in detail with reference to the accompanying drawings.

FIG. 5(A) is a side view of a elevator portion and FIG. 5(B) is a front view thereof;

DETAILED DESCRIPTION OF THE PREFERRED EMBODIMENT

Figure 2:
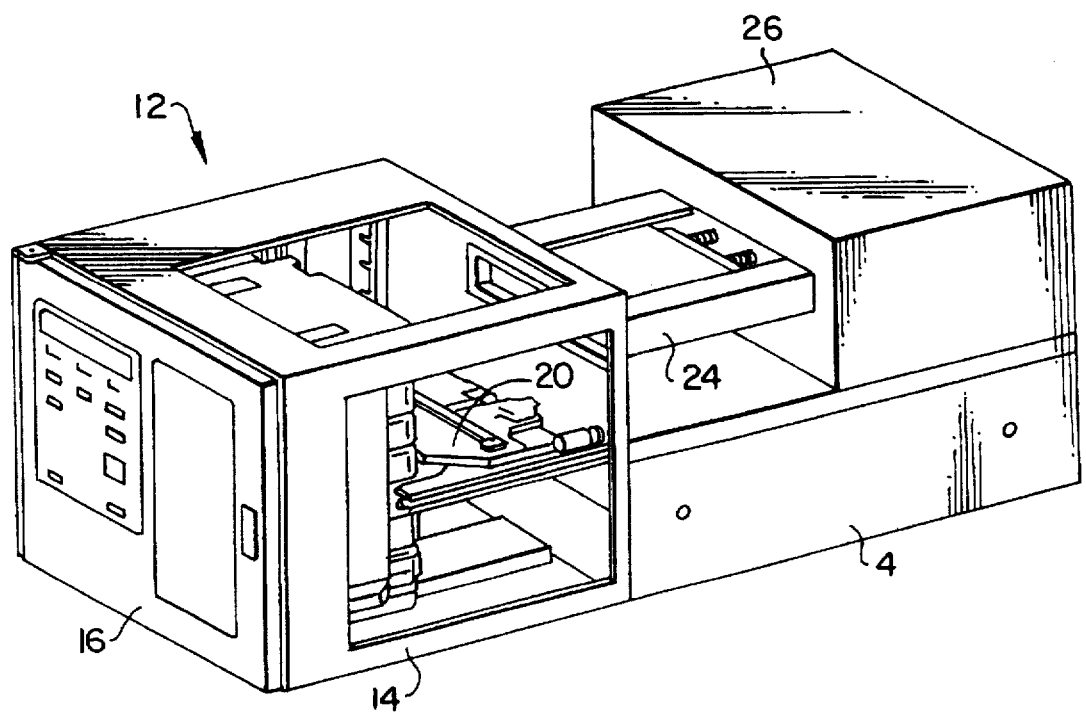
FIG. 2 is a perspective view of a magnetic tape device according to one embodiment of the present invention.
Figure 3:
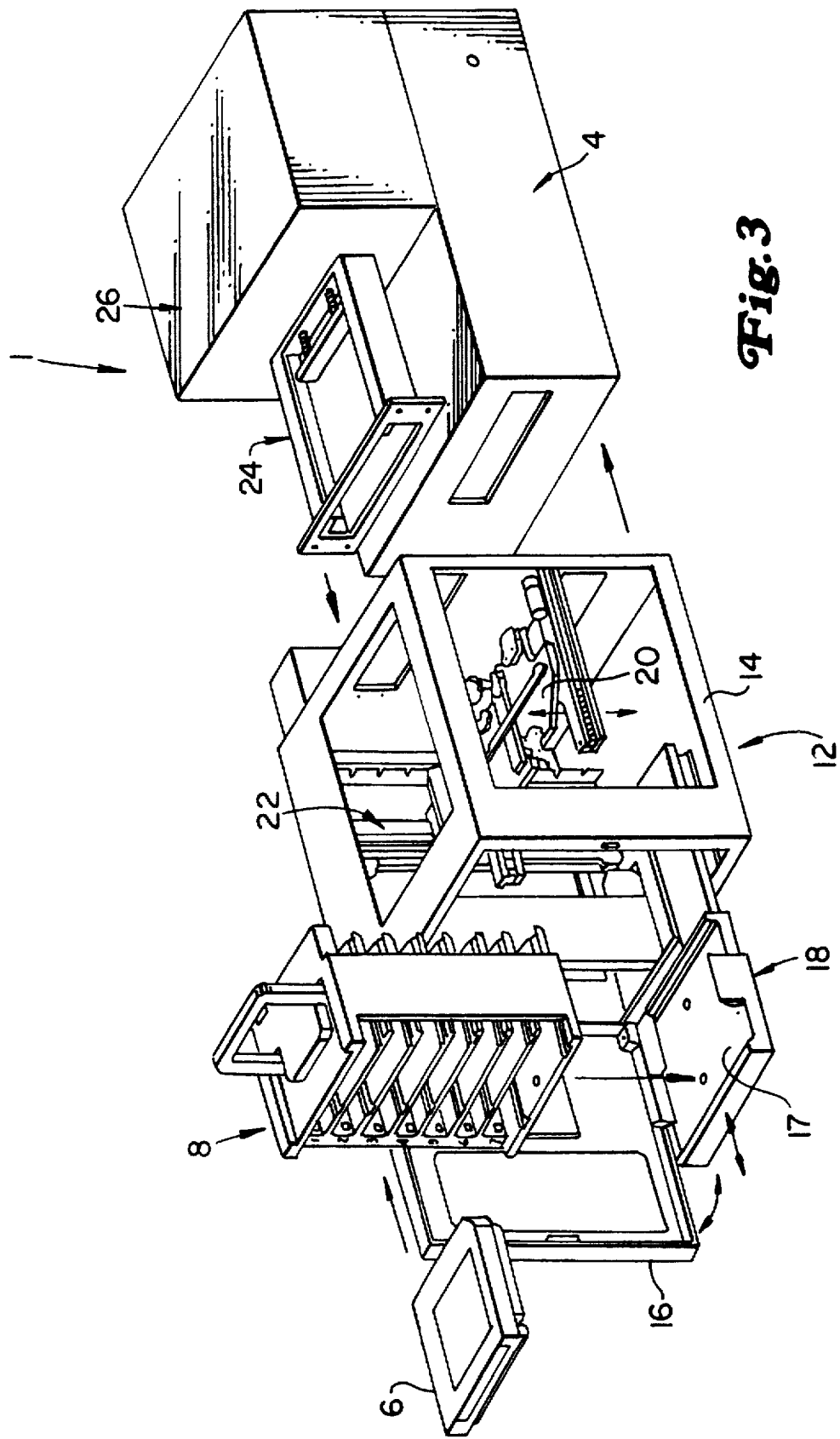
FIG. 3 is an exploded perspective view of the magnetic tape device of FIG. 2.

FIG. 2 is a perspective view of a magnetic tape device 1 with a cartridge autoloader according to an embodiment of the present invention, and FIG. 3 is an exploded perspective view of the magnetic tape device shown in FIG. 2. Substantially identical parts are represented by identical reference numerals throughout the drawings.

Referring now to FIGS. 2–3, shown is a cartridge auto loader 12 includes a housing 14 disposed external from and adjacent to a main body 4 of the magnetic tape device 1, and a door which can be opened and closed relative to the housing 14.

A magazine tray 18 having a tray portion 17 on which a magazine 8 is placed is disposed within the housing 14. The magazine tray 18 is slidable relative to a bottom portion of the housing 14 between a first position, where the tray portion 17 is inside the housing 14, and a second position, where the tray portion 17 is outside the housing 14. This movement is permitted when the door 16 is open.

A carrier portion 20 and an elevator portion 22 are provided within the housing 14. The carrier portion 20 transfers or delivers cartridges between the magazine 8 and the main body 4. The elevator portion 22 moves the carrier portion 20 in the stacking direction (vertical direction in FIGS. 2 and 3) of the cartridges 6 in the magazine 8.

In the configuration shown in FIGS. 2 and 3, the size of the bottom portion of the housing 14 is generally equal to that of a bottom portion of the main body 4. The height of the housing 14 is approximately twice the height of the main body 4. A cleaning cell 24 is mounted on an upper part of an outer side of the housing 14 on the side of the main body 4. A cleaning cartridge used for cleaning a recording/reproducing head of the main body 4 is receivable in the cleaning cell 24.

When a cleaning cell 24 is provided as mentioned above, the carrier portion 20 has an additional function, in addition to the afore-mentioned function of delivery of cartridges between the main body 4 and the magazine 8. This function is the transferring of the cleaning cartridge between the cleaning cell 24 and the main body 4 or between the cleaning cell 24 and the magazine 8.

A power source device 26 is provided for the main body 4 and cartridge auto loader 12, and its height is generally equal to the height of the main body 4. Through this arrangement, when the power source device 26 is placed on the top of the main body 4 backwardly of the cleaning cell 24, the upper surface of the power source device 26 is generally coplanar with the upper surface of the cartridge auto loader 12. Therefore, when an assembly of the main body 4, cartridge auto loader 12 and power source device 26 is housed into a rack, no extra space (wasteful space) is required.

In conventional devices where the power source device and the interface portion are arranged behind the main body, the whole device was large in size. According to the present invention, however the power source device 26, etc. are designed to be compact. The compact power source device 26, etc. are placed on the top of the main body 4. Further, through this arrangement, an efficient space for mounting the cleaning cell 24 can be obtained.

Figure 4A:
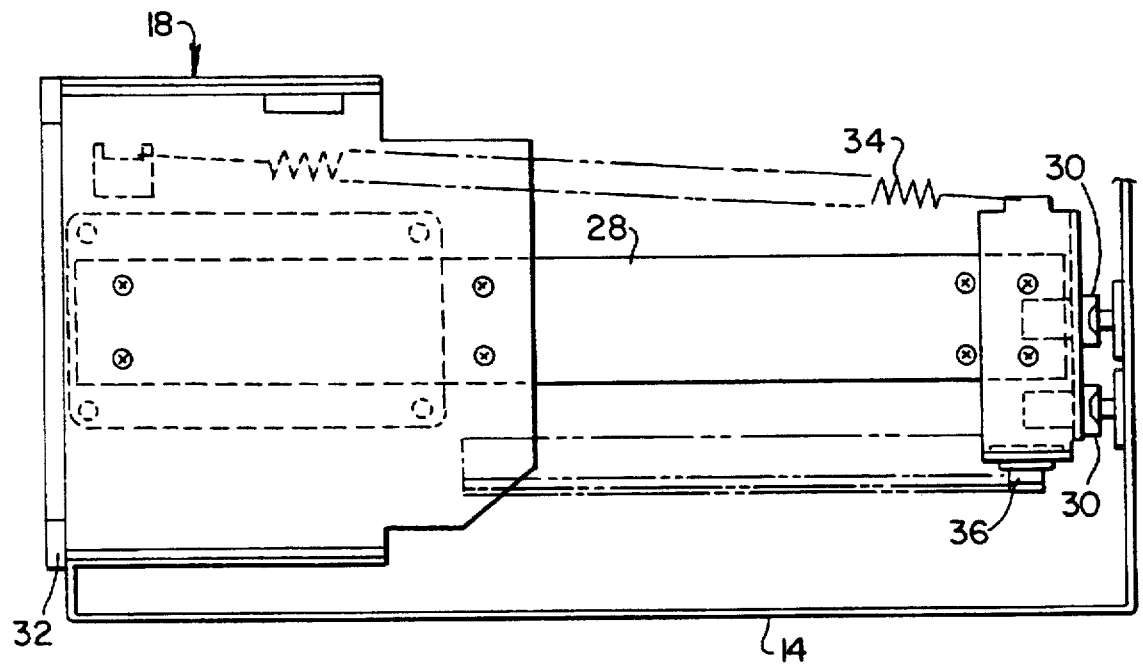
FIG. 4(A) is a top view of a magazine tray and FIG. 4(B) is a side view thereof.
Figure 4B:
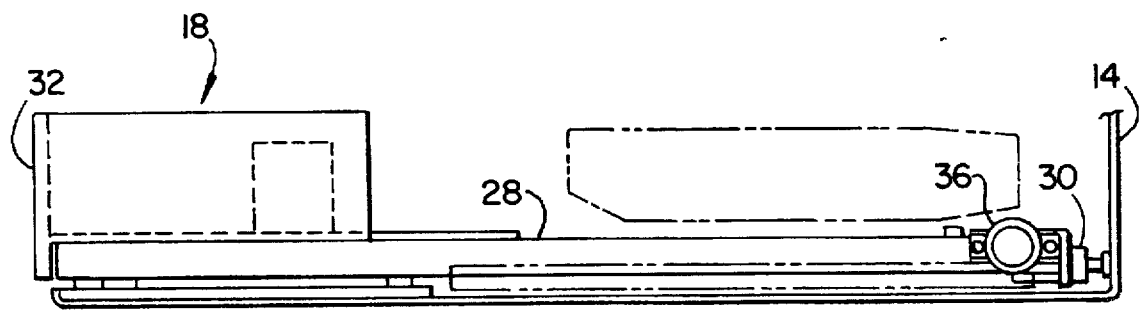

FIG. 4(A) is a top view of the magazine tray 18, and FIG. 4(B) is a side view thereof. In addition to the provision of the tray portion 17, the magazine tray 18 is provided with a rail portion 28 on which the tray portion 17 is mounted. The rail portion 28 allows the entire magazine tray 18 to be slid relative to the housing 14.

The rail portion 28 has latch portions 30 mounted on a distal end thereof. A coil spring 34 for biasing in a compressing direction is disposed between the distal end of the rail portion 28 and the housing 14.

A front frame 32 of the magazine tray 18 may be pushed from the left to the right in FIG. 4, so that magazine tray 18 is latched by the latch portions 30 relative to the housing 14. When the magazine tray 18 is latched relative to the housing 14, a push will cause the magazine tray 18 to be released from the latch portions 30 and the magazine tray 18 will be moved in the left direction in FIG. 4 through the biasing force of the coil spring 34.

An oil damper 36 may be provided on the distal end of the rail portion 28 in order to facilitate smooth movement of the magazine tray 18. The oil damper 36 includes a gear (not shown) which is mounted on the magazine tray 18 side and whose rotary force is limited, and a rack (not shown) which is mounted on the housing 14 and meshed with the gear.

FIG. 5(A) is a side view of the elevator portion 22 and FIG. 5(B) is a front view thereof. Within the housing 14, a drive pulley 38 is disposed on an upper part thereof and a driven pulley 40 is disposed on a lower part. An endless belt 42 is trained over the drive pulley 38 and over the driven pulley 40. A base member 44 for mounting the carrier portion is mounted on the endless belt 42.

The base member 44 is slidable relative to a guide 45 which is disposed in a vertical direction within the housing 14. By actuating the drive pulley 38, the base member 44 can move in the vertical direction in FIG. 5. A drive portion 46 is included for actuating the drive pulley 38.

Figure 6:
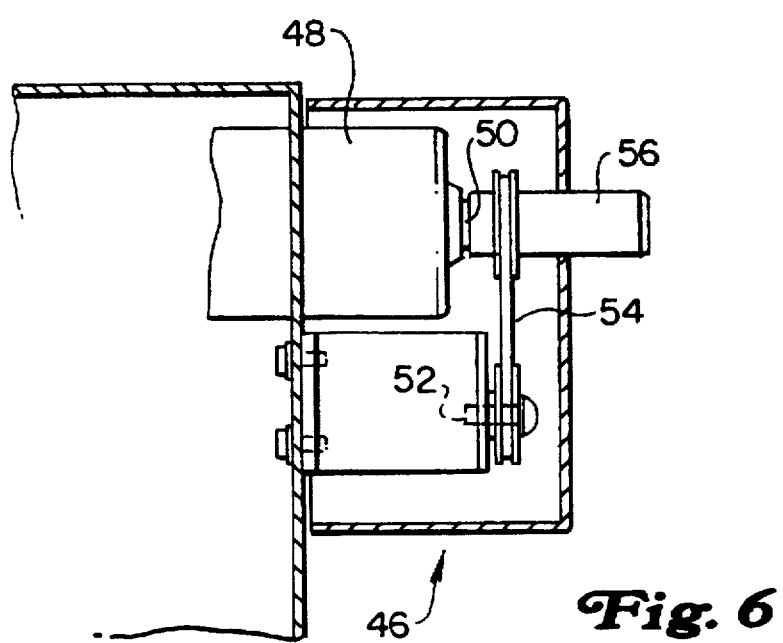
FIG. 6 is a sectional view of a drive portion.

FIG. 6 is a sectional view showing a construction of the drive portion 46 of FIG. 5 in detail. The drive portion 46 includes a motor 48, and a speed reducer (not shown) for transmitting a rotary force of a rotary shaft 50 of the motor 48 to the drive pulley 38 of FIG. 5. The drive portion also includes a driven shaft 52 disposed in parallel with the rotary shaft 50, and a belt 54 formed of an elastic body trained over a pulley mounted on the rotary shaft 50 and over another pulley mounted on the driven shaft 52. The rotary shaft 50 of the motor 48 is provided with a handle 56 so that the rotary shaft 50 can be manually rotated by the handle 56.

Figure 1:
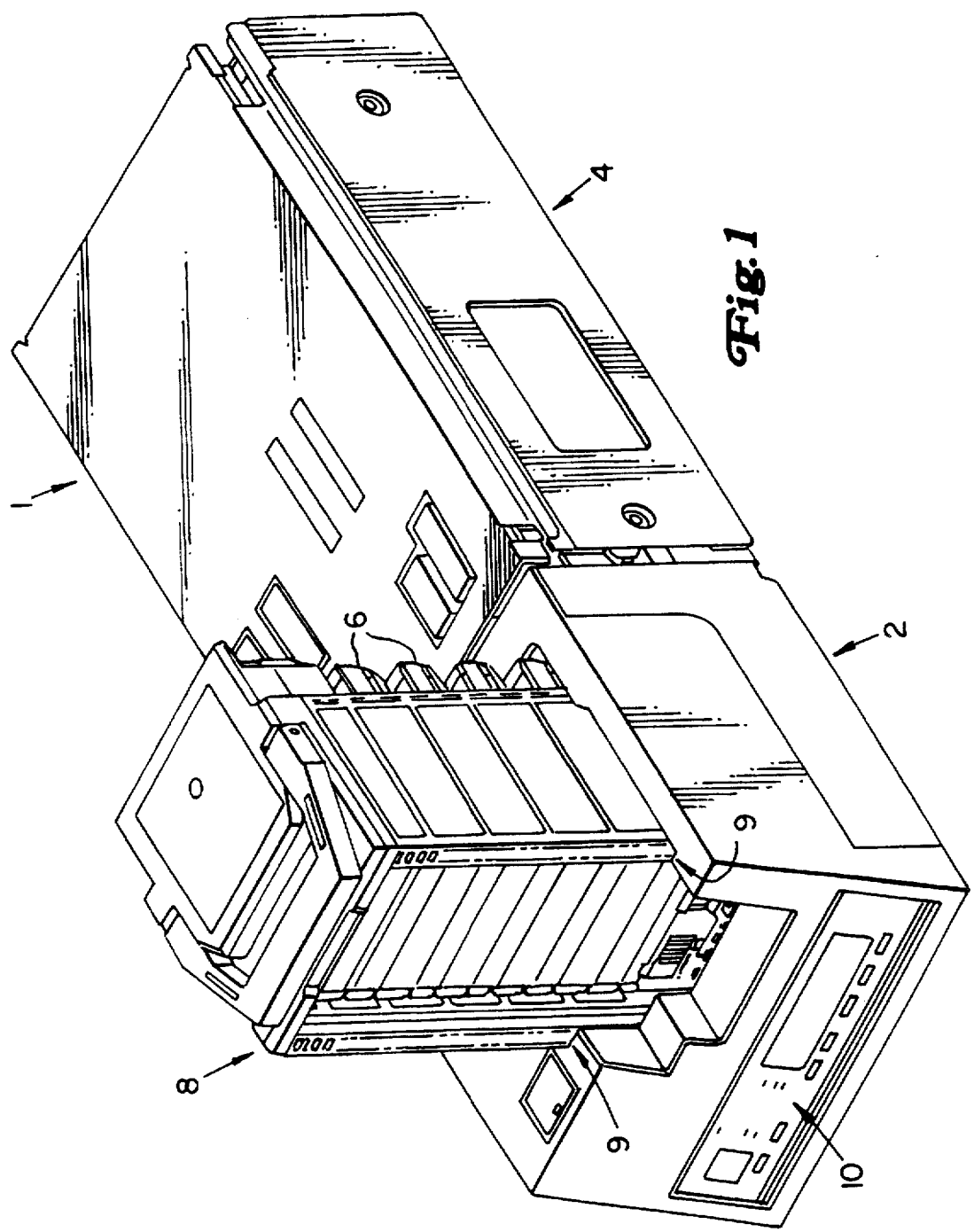
FIG. 1 is a perspective view showing one example of a prior art magnetic tape device.

The configuration of FIGS. 2–6 addresses problems which may arise in conventional devices. In the conventional tape device of FIG. 1 for example, in which a comparatively heavy magazine 8 with the plurality of cartridges 6 stored therein is mounted on the cartridge auto loader 2, the magazine 8 may be gradually slipped down or dropped (although the dropping amount is very small) by its dead weight when the magazine 8 is stopped. This may adversely affect the normal operation of the cartridge auto loader in some cases.

Therefore, such a conventional magnetic tape device is provided with a detent mechanism in order to prevent the drop of the magazine. A detent mechanism portion may be constructed such that when the magazine 8 is stopped operating, a latch is meshed with the gear for driving the magazine 8. Movement and engagement of the latch maybe made by a solenoid or the like. However, a detent mechanism portion may increase the cost and complexity of the cartridge of the cartridge autoloader.

In contrast to the conventional device, in the configuration of FIGS. 2–6, the positional displacement of the carrier portion caused by dead weight of the magazine can be prevented with a simple construction of the drive portion as shown in FIG. 6. This will be described in more detail herein below.

Referring again to FIG. 6, the belt 54 formed of an elastic body is disposed between the driving shaft 50 and the driven shaft 52. Accordingly, a frictional force inevitably generated by its elastic force acts on the driving shaft 50. This frictional force opposes the force associated with the weight of the carrier portion 20 which is applied to the drive pulley 38 of FIG. 5.

More specifically, the driving shaft 50 over the elastic belt 54 is trained is connected directly to the motor 48, and the rotary force of the driving shaft 50 is transmitted to the drive pulley 38 of FIG. 5 through the speed reducer as previously mentioned. Accordingly, the relatively small amount of frictional force generated by the elastic belt 54 can cope with the force associated with the comparatively large weight of the magazine.

At some point it may be necessary to manually move the base member 44 of FIG. 5 upwardly and downwardly due to some problem associated the drive portion 46 or its control circuit. This may be accomplished by rotating the driving shaft 50 of the motor 48 using the handle 56 of FIG. 6. The driving shaft 50 of the motor 48 can easily be rotated, since the increase of the frictional force caused by the elastic belt 54 is small.

Figure 7A:
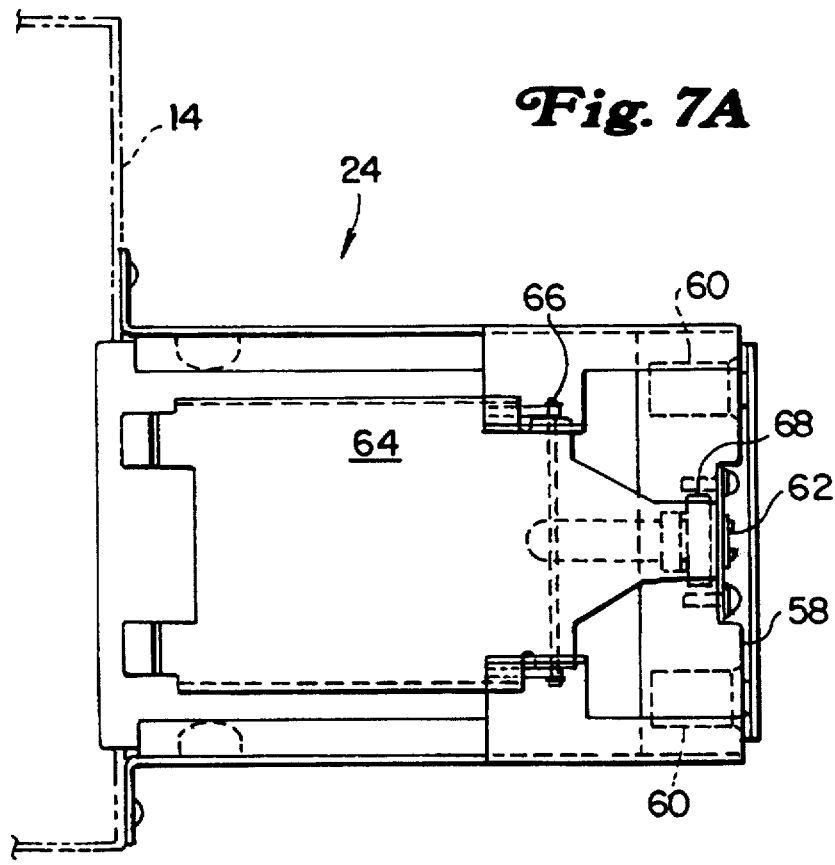
FIG. 7(A) is a top view of a cleaning cell and FIG. 7(B) is a side view thereof.
Figure 7B:
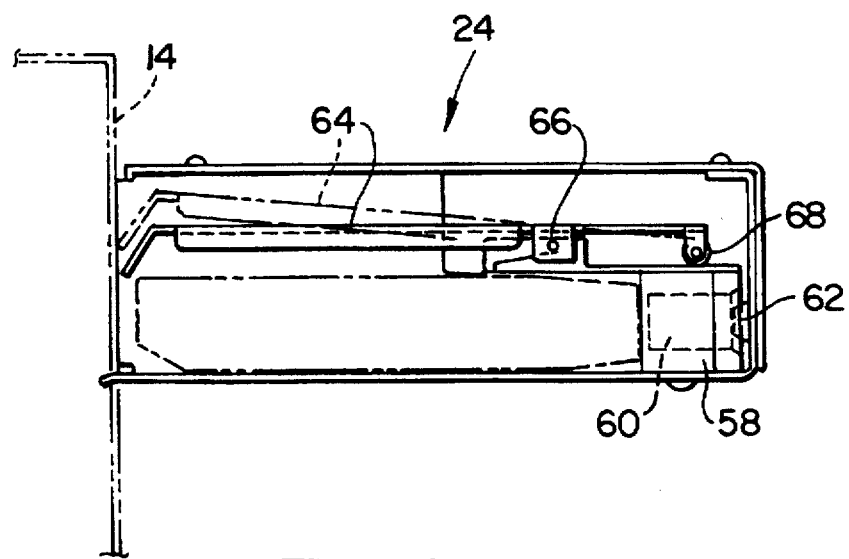

FIG. 7 (A) is a top view of the cleaning cell 24 and FIG. 7(B) is a side view thereof. The cleaning cell 24 includes a block 58 which is movable in response to the movement of the cleaning cartridge which has been introduced into the cleaning cell by the carrier portion 20 (see FIG. 3). Springs 60 bias the block 58 toward the cleaning cartridge. A latch portion 62 may latch the block 58 against the biasing force of the springs 60. A cell door 64 opens and closes in operative connection with the block 58.

A problem may arise if the inlet port of the cleaning cell 24 is left open constantly. In such a case an external impact or similar occurrence may cause the cleaning cell 24 to be dropped into the cartridge auto loader through the inlet port. A door to open or close and to block the cartridge inlet port is generally a complicated mechanism including a driving source such as a motor. In contrast, the problem may be solved with a simple construction as shown in FIG. 7.

As seen in FIG. 7, when the cleaning cartridge is inserted into the cleaning cell while the cell door 64 is open, the block 58 is moved from the left to the right along with the movement of the cleaning cartridge and is temporarily latched by the latch portion 62. The cell door 64 is swingably or turnably mounted on a shaft 66, and a roller 68 is mounted on a rear end of the cell door 64.

When the block 58 is moved from the left to the right in FIG. 7, a right end of the cell door is lifted upwardly through the roller 68 seen in FIG. 7(B). As a consequence, a left end of the cell door 64 blocks an opening portion of the cleaning cell 24 opposite to the housing 14.

The cell door 64, by partially blocking the opening portion, prevents undesirable movement of the cleaning cartridge. During removal of the cleaning cartridge from the cleaning cell 24, an exposed part of the cleaning cartridge is pushed from inside the housing 14 to unlatch the latch portion 62 and block 58 is moved by the biasing force of the springs 60.

In FIG. 7(B), the cell door 64 is biased counterclockwise by a coil spring (not shown). Accordingly, when the block 58 is moved to the left as a result of unlatching of the latch portion 62, the cell door 64 is turned clockwise in FIG. 7(B) since block 58 moves out from under the roller 68. This allows the cleaning cell to be taken out.

Figure 8:
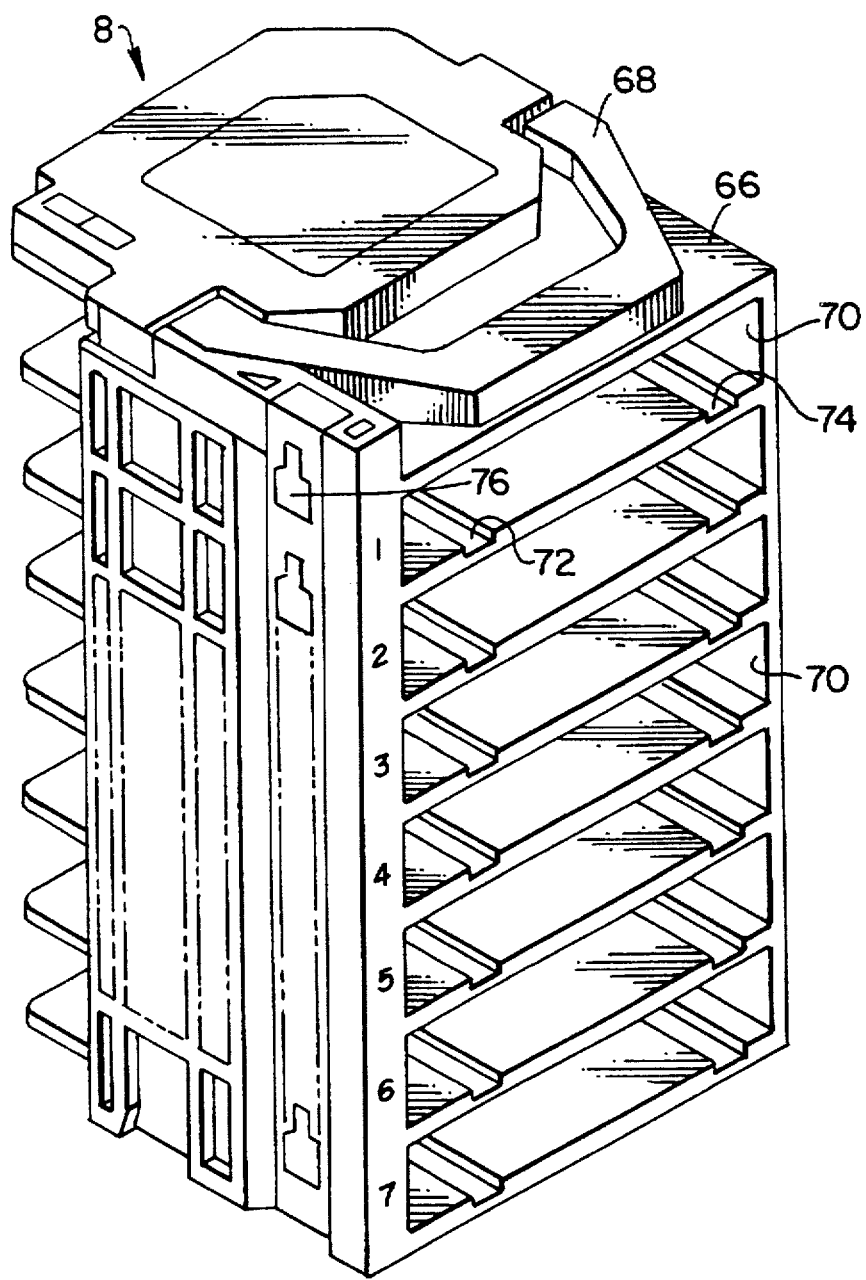
FIG. 8 is a perspective view of a magazine.

FIG. 8 is a perspective view of the magazine 8. The magazine 8 includes a generally rectangular parallelepiped magazine body 66 and a handle 68 provided on an upper part of the magazine body 66. In this embodiment, seven cartridge storing portions 70 are formed in the magazine body 66. Each cartridge storing portion 70 is provided with two parallel grooves 72 and 74 which are formed in a bottom surface thereof. A lock mechanism 76 for preventing inserted cartridges from escaping is provided on one side portion of the magazine body 66.

In this example, the grooves 72 and 74 of each cartridge storing portion 70 are eccentrically placed at unequal distances from respective side walls of the cartridge storing portion. The particular placement of the grooves may change in accordance with the cartridges used.

Projections corresponding to the grooves 72 and 74 are formed on a bottom portion of each cartridge. Through the eccentric placement of grooves 72 and 74 and corresponding cartridge projections, insertion of a cartridge in an improper direction is prevented. Cartridges can be inserted into the storing portions 70 of the magazine from either side thereof.

Figure 9A:
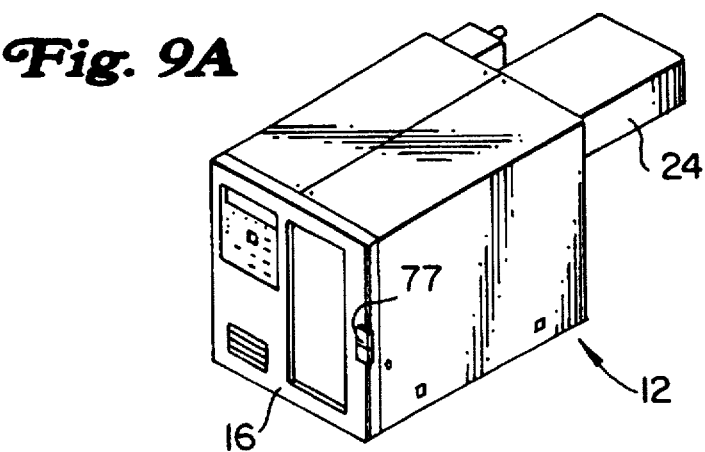
FIGS. 9A–9C are explanatory views for explaining a method for operating a magnetic tape device according to one embodiment of the present invention.
Figure 9B:
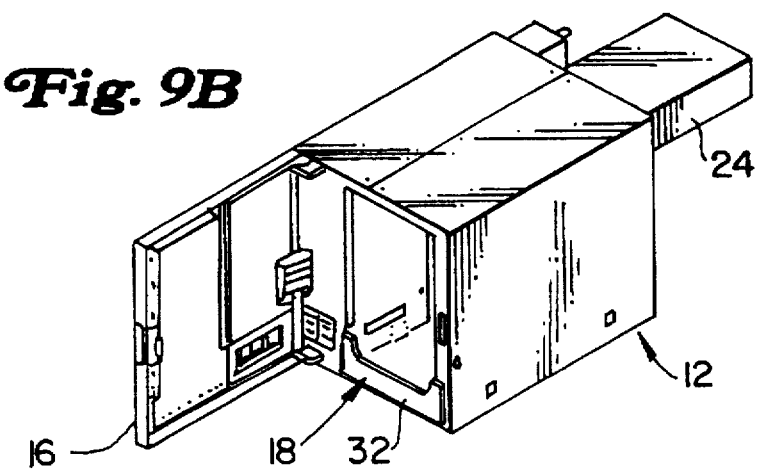

Next, a method for operating a magnetic tape device constructed in accordance with FIGS. 2-8 will be described with reference to FIG. 9. In FIG. 9(A), a push button 77 provided on one end portion of the door 16 is pressed. Pressing of the button 77 causes the door 16 to open as shown in FIG. 9(B).

Figure 9C:
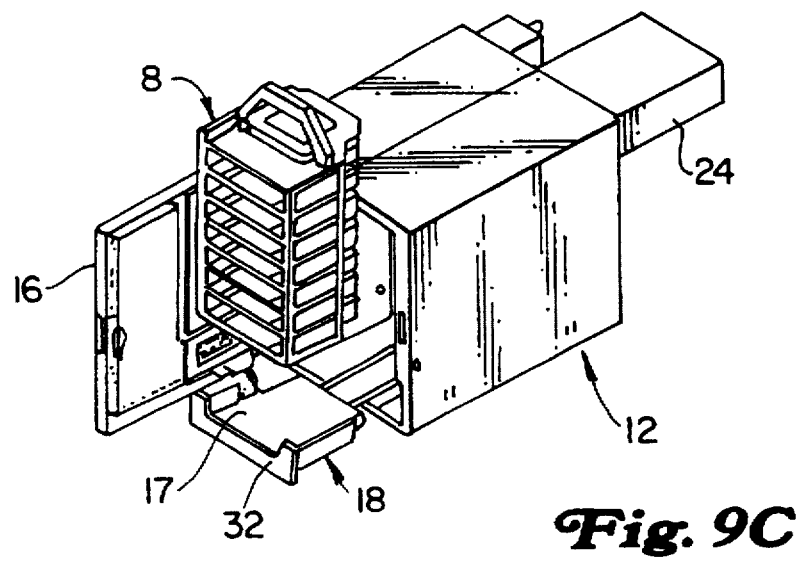

Then, the front frame 32 of the magazine tray 18 is pushed. Thus, the latch portions 30 (as illustrated in FIG. 4) are unlatched and the magazine tray 18 is moved outwardly of the housing. As shown in FIG. 9(C), the magazine 8 is placed on the tray portion 17 of the magazine tray 18 which has been slid outwardly of the housing. Subsequent to placement of the magazine 8 on the portion 17, the front frame 32 of the magazine tray 18 is pushed back into the housing. Thus, the magazine tray 18 is moved into the housing and latched within the housing by the latch portions 30 (see FIG. 4). After the magazine tray is latched, the door 16 is closed and an operation button for starting the operation panel is pressed. After the operation panel is started the door is locked by a lock mechanism of the door.

Figure 10A:
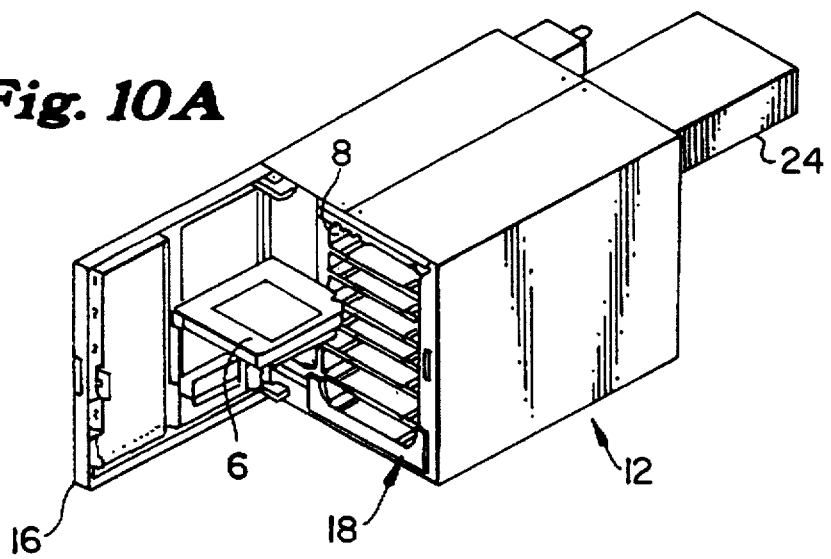
FIGS. 10A–10B are explanatory views for explaining a method for receiving a cartridge according to one embodiment of the present invention.
Figure 10B:
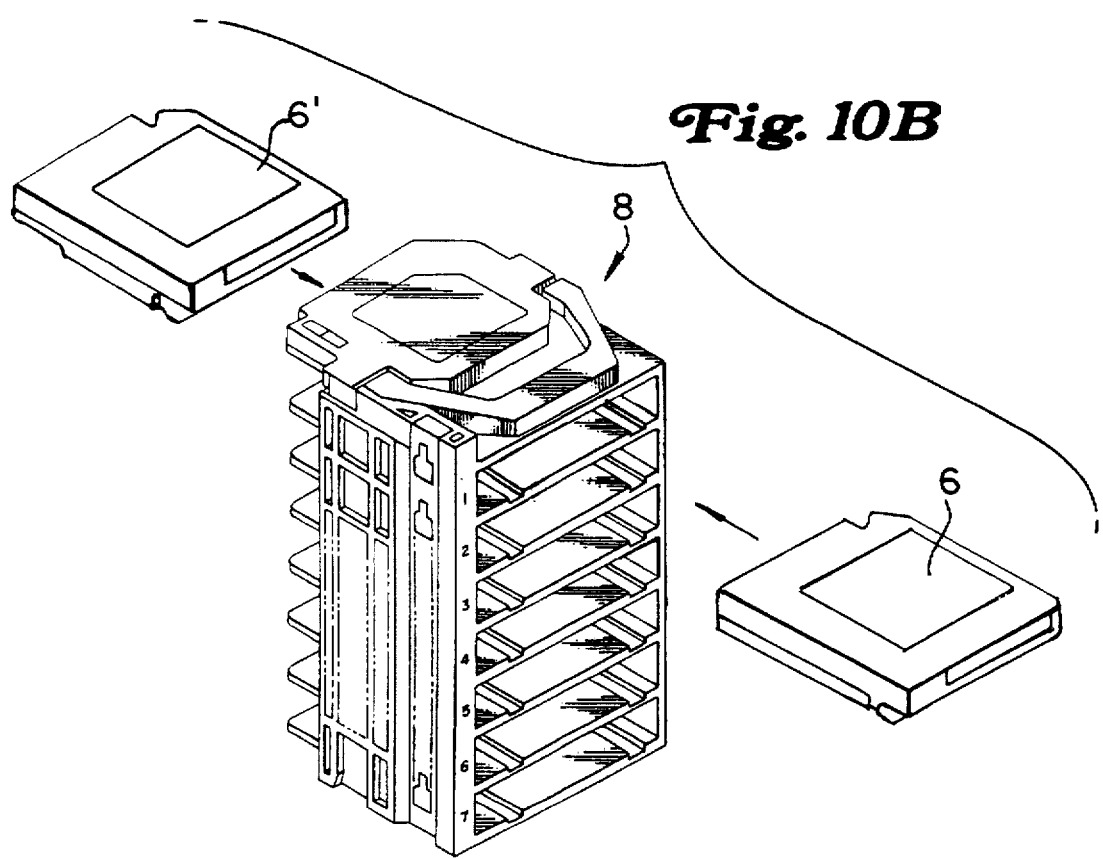

Next, a method for storing cartridges into the magazine 8 will be described with reference to FIG. 10. As shown in FIG. 10(A), cartridge 6 can be inserted into the magazine 8 after the magazine tray 18 on which the magazine 8 has been placed is set within the housing 14. Also, as shown in FIG. 10(B), the cartridge 6 or cleaning cartridge 6' can be inserted into the magazine 8 which has been taken out of the cartridge auto loader 12.

Figure 11:
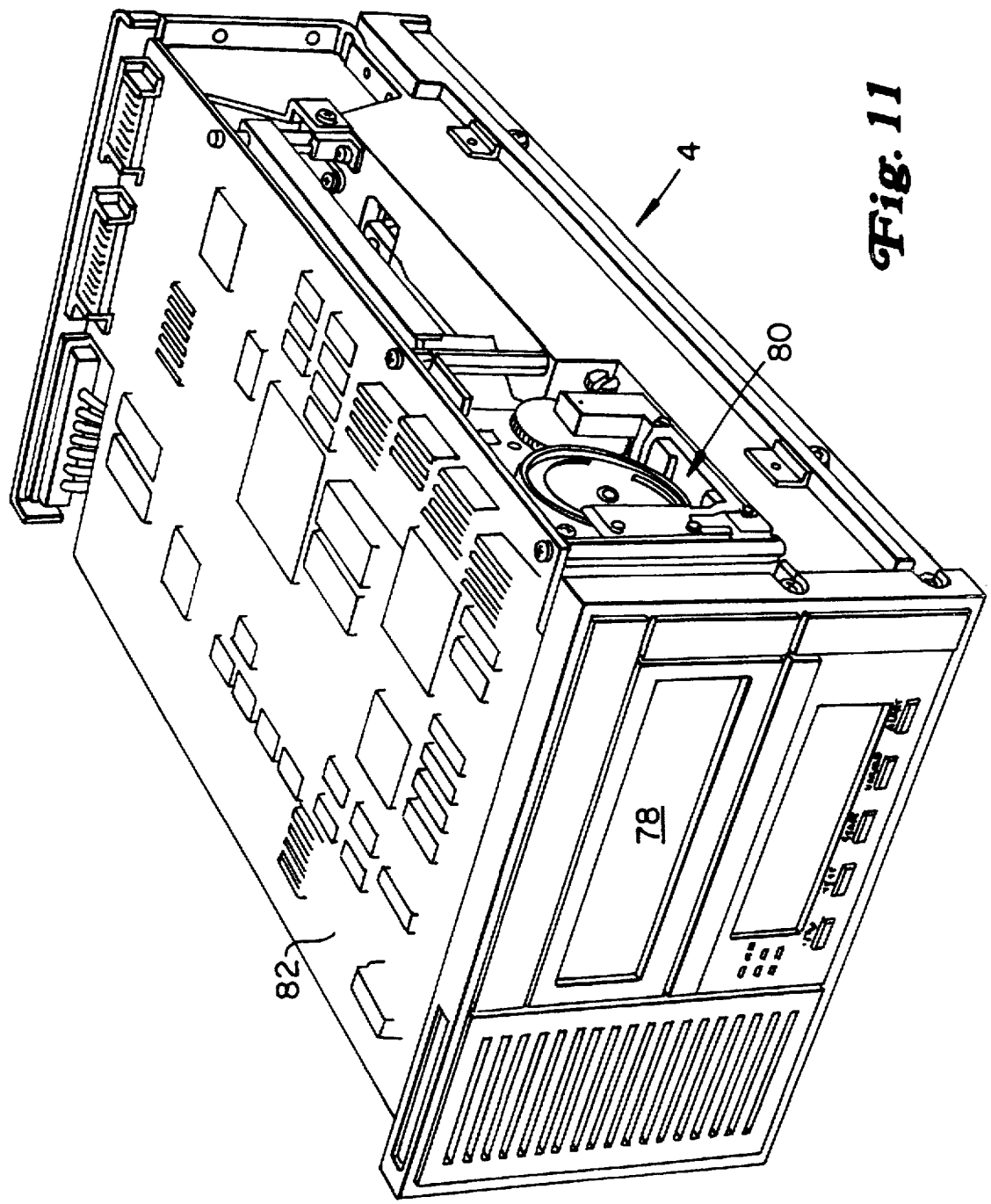
FIG. 11 is a perspective view of a magnetic tape recorder.

FIG. 11 is a perspective view of a main body 4 of the magnetic tape device. An inlet port 78 is formed in a front panel of the main body 4. A cartridge fed into the main body 4 through the inlet port 78 by the carrier portion 20 (see FIG. 3) is set in a predetermined position within the main body 4 by a feed mechanism portion 80. Then, the cartridge is subjected to recording/reproducing. Reference numeral 82 denotes a circuit unit such as a control circuit. The main body 4 of the magnetic tape device herein used is equivalent to that of a magazine tape device manufactured by Fujitsu Limited, unit No. M2483X.

Figure 12:
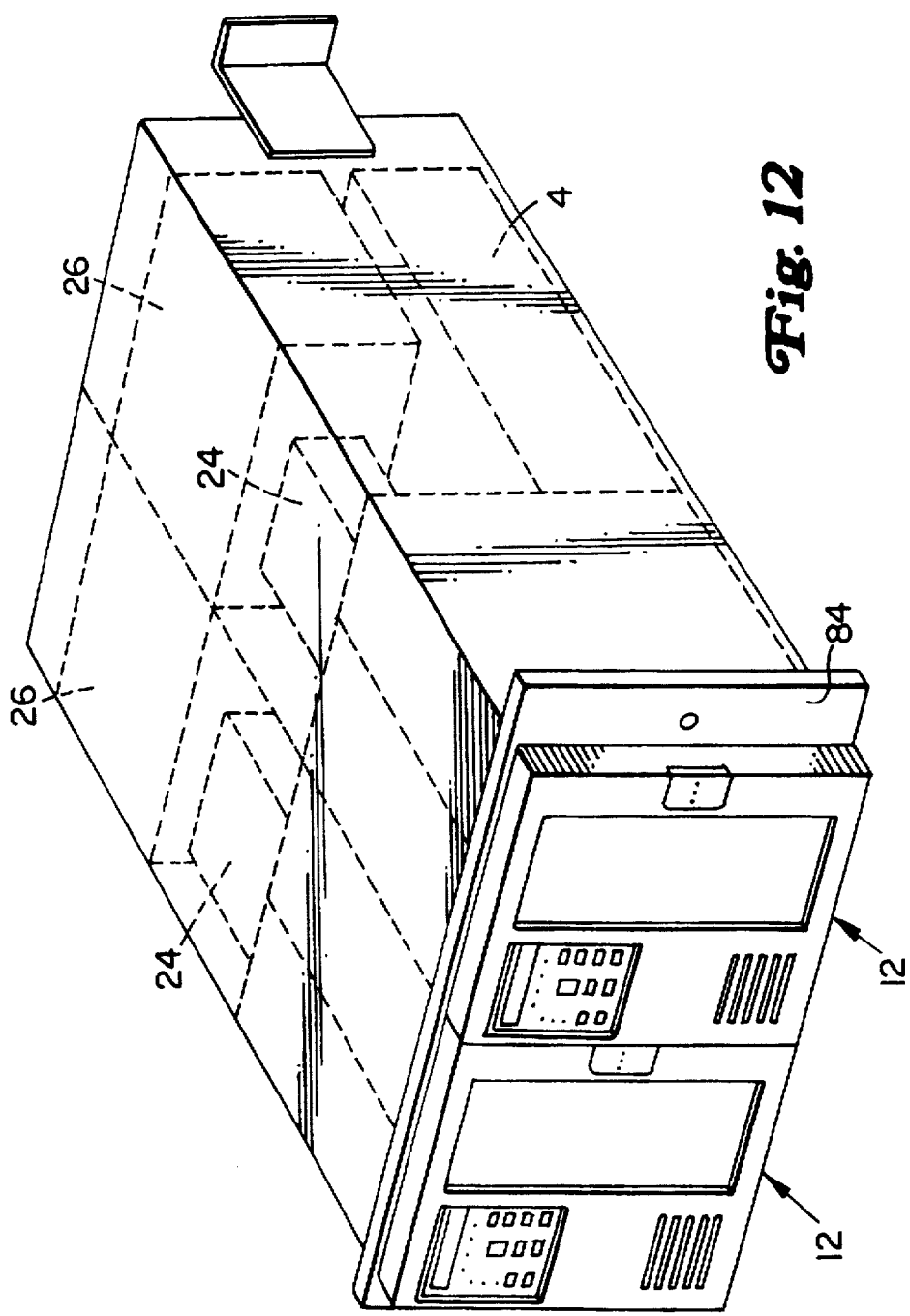
FIG. 12 is a perspective view showing two magnetic tape devices according to one embodiment of the present invention, mounted in two racks (or twin racks)

FIG. 12 is a perspective view showing two magnetic tape devices in accordance with the present invention housed in two racks. Two magnetic tape devices each including the main body 4, cartridge auto loader 12, cleaning cell 24 and power source 26 are mounted, side by side, in two racks 84. The cartridge auto loader 12 internally contains the magazine 8. Through this arrangement it is not necessary to provide space for moving the magazine upwardly and downwardly outside the tape device as in the prior art device. Thus, the mounting efficiency is increased and space directly above and below the racks 84 may by utilized.

Figure 13:
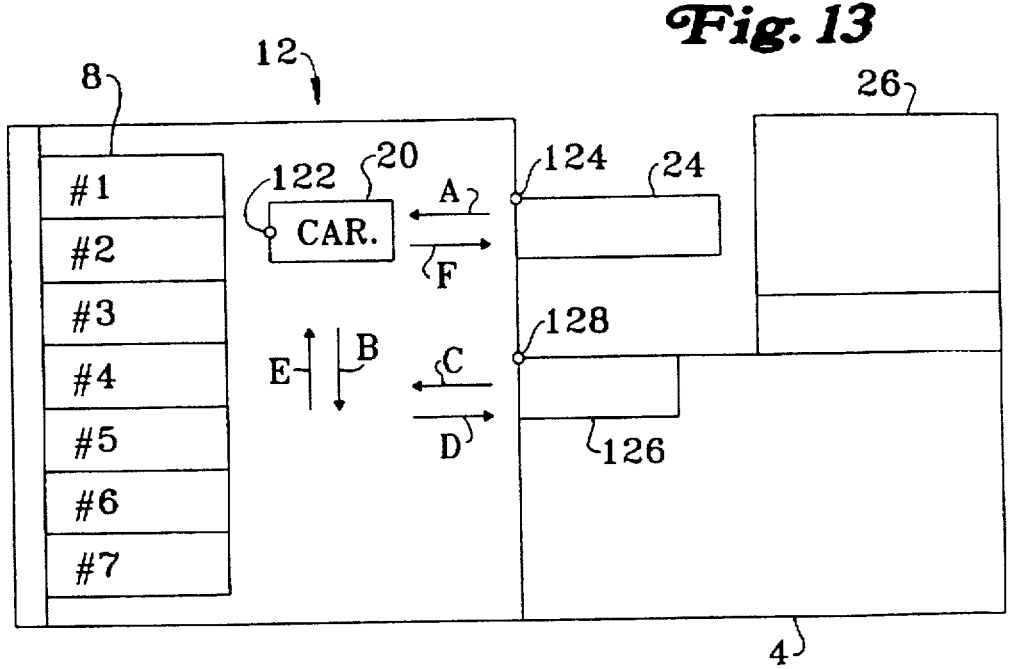
FIG. 13 is a schematic view of a magnetic tape device for explaining the action of a carrier portion.

FIG. 13 is a schematic view of a magnetic tape device for explaining the action, etc. of the carrier portion 20. In this embodiment, the magazine 8 has seven slots (#1 to #7) in the vertical direction and each slot is capable of receiving a normal cartridge or cleaning cartridge.

The carrier portion 20 is driven along the magazine 8 by an elevator portion not shown in this Figure. The carrier portion 20 is provided with a carrier position detection sensor 122. The sensor 122 detects which slot of the magazine 8 the position of the carrier portion 20 is positioned across from.

A discharge sensor 124 is within the cleaning cell 24. The discharge sensor 124 detects insertion and or discharge of cleaning cartridges.

A cartridge detection sensor 128 is provided at a location near the cartridge inlet port 78 of a loader 126 of the main body 4. The sensor 128 judges whether or not the cartridge inserted into the loader 126 is a normal cartridge. As is apparent from FIG. 13, the cleaning cell 24 is in a position corresponding to the slot #2 of the magazine 8 in this embodiment.

Figure 14A:
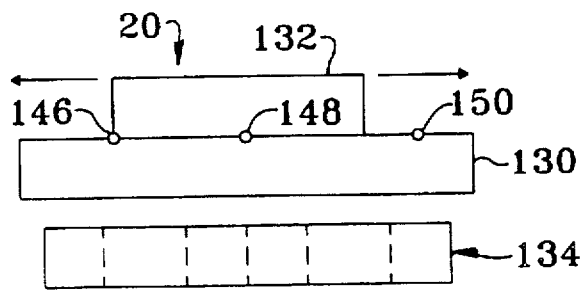
FIGS. 14A–14B are explanatory views for explaining the construction and action of the carrier portion.
Figure 14B:
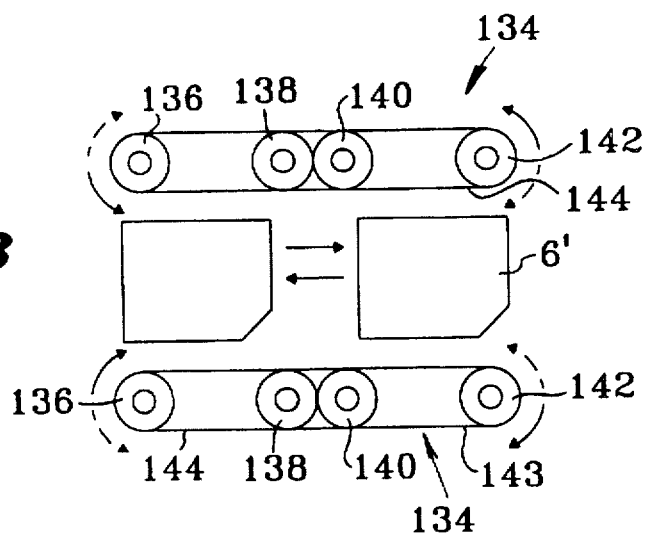

FIG. 14 is an explanatory view for explaining the construction and action of the carrier portion 20. FIG. 14(A) is a view when the carrier portion 20 is viewed from one side, and FIG. 14(B) is a view when the carrier portion is partly viewed from above.

The carrier portion 20 includes a carrier base 130 which is supported by an elevator portion, a mount arm 132 which can be moved in a lateral direction in FIG. 14(A) relative to the carrier base 130, and a pair of feeder arms 134 for moving the cartridge from the magazine side to the main body side and from the main body side to the magazine side. The mount arm 132 pushes the cartridge into the magazine, cleaning cell or main body.

Each feeder arm 134 includes a drive roller 136, driven rollers 138, 140 and 142, and an endless belt 143 trained over the rollers. The feeder arm 134 is turnable about a middle point between the pulleys 138 and 140 while normally maintaining a mirror image relation. Through the turning action, the feeder arms 134 with the cartridge sandwiched therebetween rotates the drive rollers 136, thus making it possible to move the cartridge in the lateral direction in FIG. 14(B).

During moving the carrier portion 20 along the magazine 8 or clamping the cartridge on the cleaning cell side or the main body side, the feeder arms 134 are open on the magazine side as shown by a broken line arrow of FIG. 14 (B). Alternatively, for clamping the cartridge on the magazine side, the feeder arms 134 are closed on the magazine side, as shown by a solid line arrow.

In the description to follow, the term "close" refers to the state where the feeder arms 134 are closed on the magazine side, and the term "Open" refers to the state where the feeder arms 134 are open on the magazine side.

Three sensors 146, 148 and 150 for detecting the position of the mount arm 132 are mounted on the carrier base 130. The sensor 146 detects the mount arm 132 on the magazine side, the sensor 148 detects the mount arm 132 in the home position, and the sensor 150 detects the mount arm 132 on the main body side.

Figure 15:
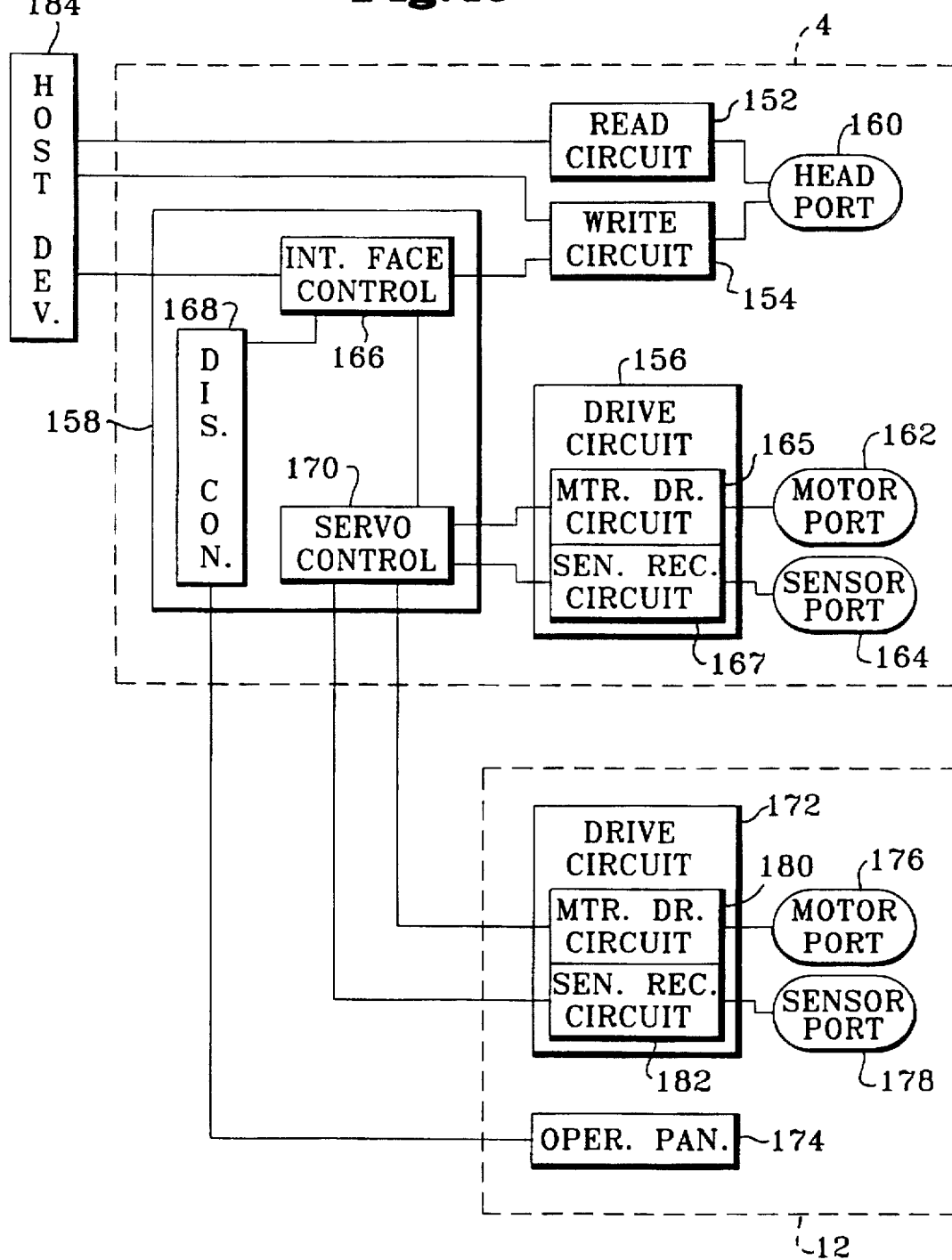
FIG. 15 is a block diagram showing hardware for executing an automatic cleaning mode.

Referring now to FIG. 15, the main body 4 includes a read circuit 152, a write circuit 154, a drive circuit 156, a control unit 158, a head portion 160, a motor portion 162, and a sensor portion 164. The read circuit 152 sends read data read from the head portion 160 to a host device 184. The write circuit 154 performs writing to a magnetic tape based on write data from the host device 184 through the head portion 160.

The drive circuit 156 includes a motor drive circuit 165 which is connected to the motor portion 162, and a sensor receiving circuit 167 which is connected to the sensor portion 164. The control unit 158 includes an interface control circuit 166, a display control circuit 168, and a servo control circuit 170.

The interface control circuit 166 controls the write circuit 154, display control circuit 168 and servo control circuit 170 in accordance with the control data from the host device 184.

The cartridge auto loader 12 includes a drive circuit 172, an operator panel 174, a motor portion 176, and a sensor portion 178. The drive circuit 172 includes a motor drive circuit 180 which is connected to the motor portion 176, and a sensor receiving circuit 182 which is connected to the sensor portion 178.

The display control circuit 168 is connected to the operator panel 174, and the servo control circuit 170 is connected to the motor drive circuits 165 and 180 and the sensor receiving circuits 167 and 182.

Operation of the cleaning cell 24 will now be described with reference to FIGS. 2 and 3. The cleaning cartridge 6' is normally housed in the cleaning cell 24. Thus, cleaning can be conducted in the main body 4 using the cleaning cartridge without wasting a magazine cell or requiring operator involvement. Additionally, the cleaning cartridge in the cleaning cell 24 can be replaced with a new one as may be necessary.

Cleaning function may be initiated automatically or through use of the operator panel. An automatic cleaning mode for automatically performing a cleaning with respect to the main body 4 is initiated in accordance with a command from a host computer (host device), using the cartridge 6' within the cleaning cell 24. A manual cleaning mode for performing a cleaning with respect to the main body 4 using the cartridge 6' within the cleaning cell 24 is initiated through the use of the operator panel.

In either mode, the cleaning is performed as follows after manual or automatic initiation. After cleaning mode initiation, the carrier 20 is caused to move from the current position to the location of the cleaning cell 24 (second story from the top in the illustrated embodiment). The cleaning cartridge 6' within the cleaning cell 24 is discharged by a mount arm of the carrier 20 through a pushing-out action of the mount arm. This pushing out action allows release of the cleaning cartridge 6' through the mechanisms described with reference to FIG. 7(B). As a result, the cleaning cartridge 6' is discharged from the cleaning cell 24, and is fed into the carrier 20. Subsequently, the carrier 20 is moved to a home position aligned with the inlet port 78 of the main body 4.

Subsequently, the cleaning cartridge is fed into the main body 4, and cleaning procedures are executed by the main body 4. When cleaning procedures are completed the cleaning cartridge 6' is discharged by the main body 4, and the cleaning cartridge 6' is unfed or brought back into the carrier 20. The carrier 20 is moved to the location of the cleaning cell 24. Then, the cleaning cartridge is pushed into the cleaning cell 24 by the mount arm 132 of the carrier 20 through its pushing-out action, thus finishing the procedure.

Occasionally, a cleaning cartridge may need to be replaced. Such a need may arise when the frequency of the use of the cleaning cartridge within the cleaning cell 24 reaches a predetermined critical point. At this time the cartridge can be replaced with a new one. The critical point may be set a 500 cleaning procedures, for example. The steps of the cleaning cartridge replacement procedure are as follows.

First, the magazine 8 with the cleaning cartridge 6' (which is to be inserted into the cleaning cell 24) set in the top cartridge storing portion 70 and with an empty cartridge storing portion 70 second from the top is set in the cartridge auto loader 12 through use of previously described steps (FIG. 9), and the cartridge replacement mode is designated through control panel 1. When a replacement menu is selected and a test switch is pressed, the carrier 20 is moved upwardly and downwardly while checking whether or not the cartridge is present in the magazine 8.

The carrier 20 is brought to the location (second story from the top) and the cleaning cartridge within the cleaning cell 24 is discharged by the mount arm 132 through its pushing-out action. The cleaning cartridge is fed into the carrier 20 so as to be brought back into the cartridge storing portion 70 second from the top of the magazine 8.

Subsequently, the carrier 20 is brought to the top cartridge storing portion 70 and the cleaning cartridge is fed into the carrier 20. Thereafter, the carrier 20 is brought into the home position aligned with the inlet port 78 and the cleaning cartridge is fed into the main body 4.

After the cleaning cartridge is pushed in by the mount arm, the main body 4 determines whether or not the cartridge is a cleaning cartridge. If the result of the checking is affirmative, the cartridge is discharged from the main body 4.

The cartridge, which has been discharged from the main body 4, is brought back into the carrier 20 and the carrier 20 is brought to the location of the cleaning cell 24. Then, the cartridge is brought back to the cleaning cell 24 and the cartridge is pushed in by the mount arm, thereby finishing the procedure.

When a cleaning cartridge changing procedure is finished, usage frequency of the cleaning cartridge is cleared from the circuitry. The usage frequency is stored, for example, in a memory unit in a control device.

Figure 16:
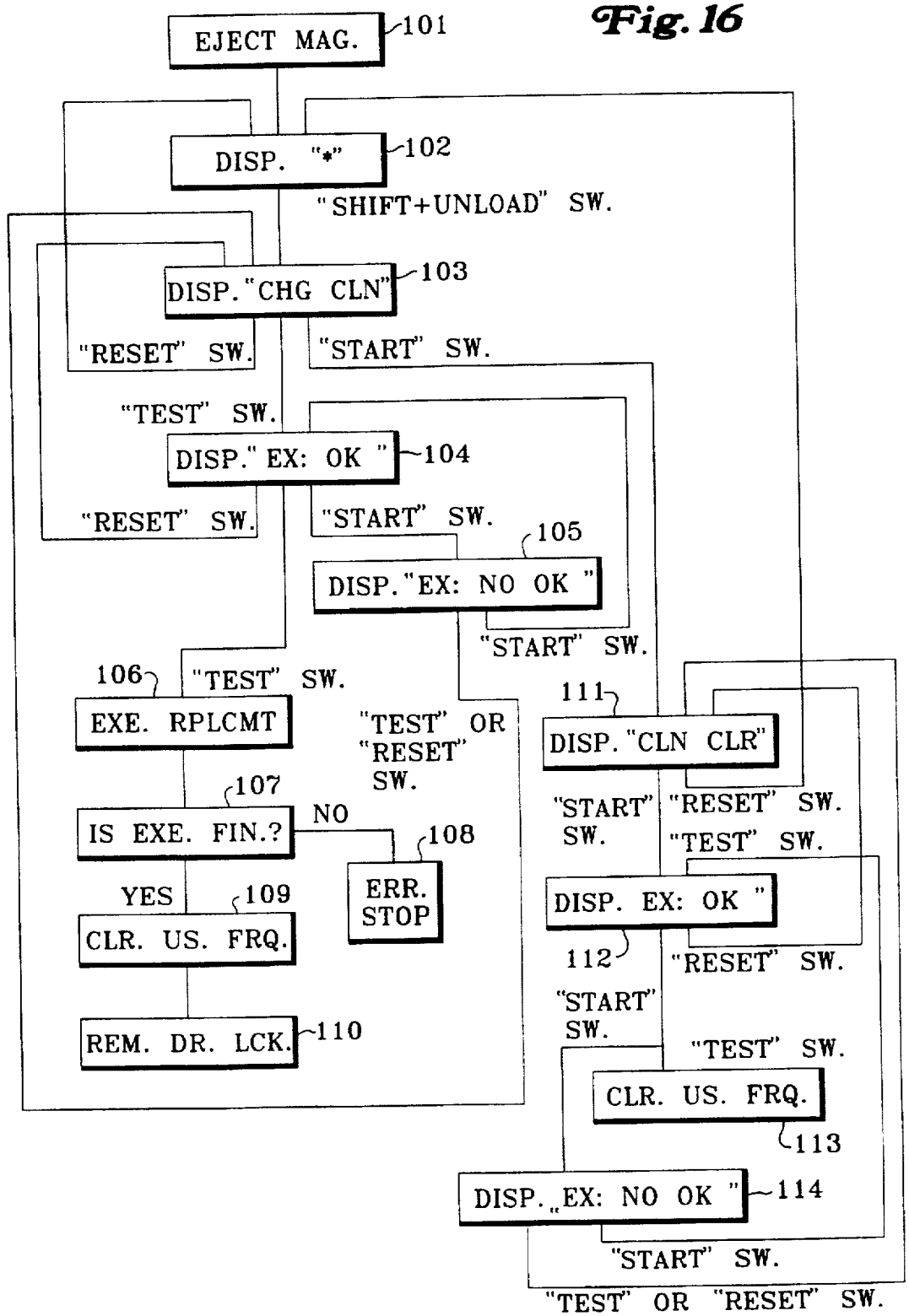
FIG. 16 is a flow chart showing the flow of operation for the cleaning function imitated by use of an operator panel switch.

FIG. 16 is a flow chart showing operation steps of the cleaning function initiated through the operator panel switch.

In step 101, cartridges other than the cleaning cartridge within the magazine 8 are ejected therefrom. When this magazine 8 is set into the cartridge auto loader 12 and the door is closed, a mark "*" is displayed on the display unit (in step 102).

Simultaneous actuation of a shift switch and an unload switch on the operator panel causes "CHG CLN" to be displayed in Step 103. If a reset switch is depressed, the procedure returns to Step 102. If a test switch is depressed, "EX, OK" is displayed on Step 104.

When the reset switch is depressed subsequent to Step 104, the procedure returns to Step 103. When the test switch is depressed subsequent to Step 104, the procedure proceeds to Step 106 where replacement of the cleaning cartridge is executed. Subsequently, it is judged in Step 107 whether or not the replacement of the cleaning cartridge is finished. If the judgement result is negative, the procedure proceeds to Step 108 where an error stop is executed. Alternatively, if the judgement result is affirmative, the procedure proceeds to Step 109 where the stored use frequency is cleared. Then in Step 110, the door lock is released.

When a start switch is depressed subsequent to Step 104, "EX, NO OK" is displayed in Step 105. When the test switch or reset switch is depressed subsequent to Step 105, the procedure returns to Step 103, and when the start switch is depressed subsequent to Step 105, the procedure returns to Step 104.

Alternatively, when the start switch is depressed in Step 103, the procedure proceeds to Step 111 where "CLN CLR" is displayed. When the start switch is depressed subsequent to Step 111, the procedure proceeds to Step 112 where "EX, OK" is displayed. When the test switch is depressed subsequent to Step 112, the procedure proceeds to Step 113 where the frequency of the use is cleared. When the start switch is depressed subsequent to the Step 112, the procedure proceeds to Step 114 where "EX, NO OK" is displayed. When the start switch is depressed subsequent to Step 114, the procedure returns to Step 112, and when the test switch or reset switch is depressed, the procedure returns to Step 111.

When the reset switch is depressed in Step 112, the procedure also returns to Step 111. When the reset switch is depressed subsequent to Step 111, the procedure returns to Step 102.

Figure 17:
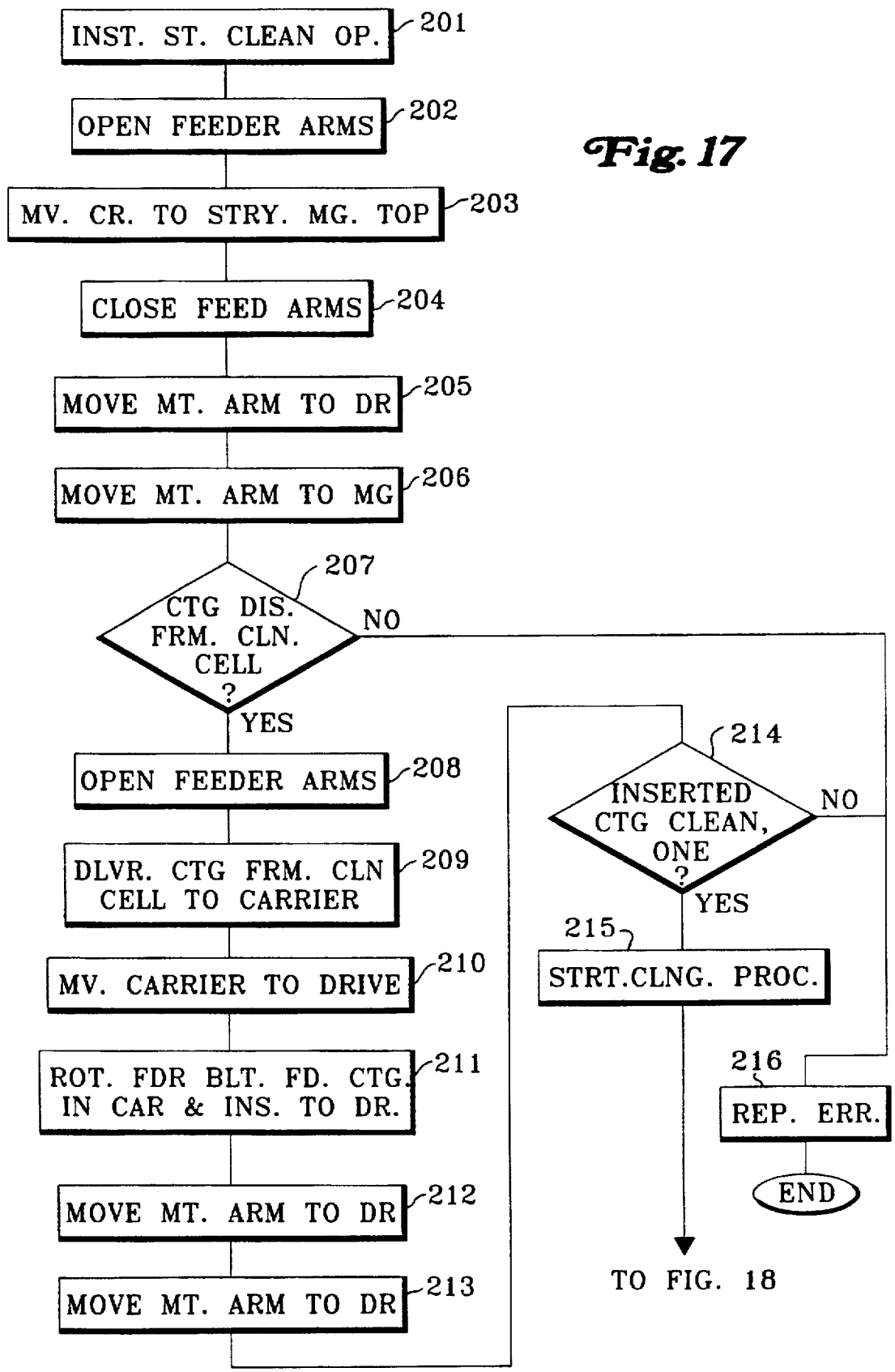
FIG. 17 is a flow chart of the automatic cleaning mode.
Figure 18:
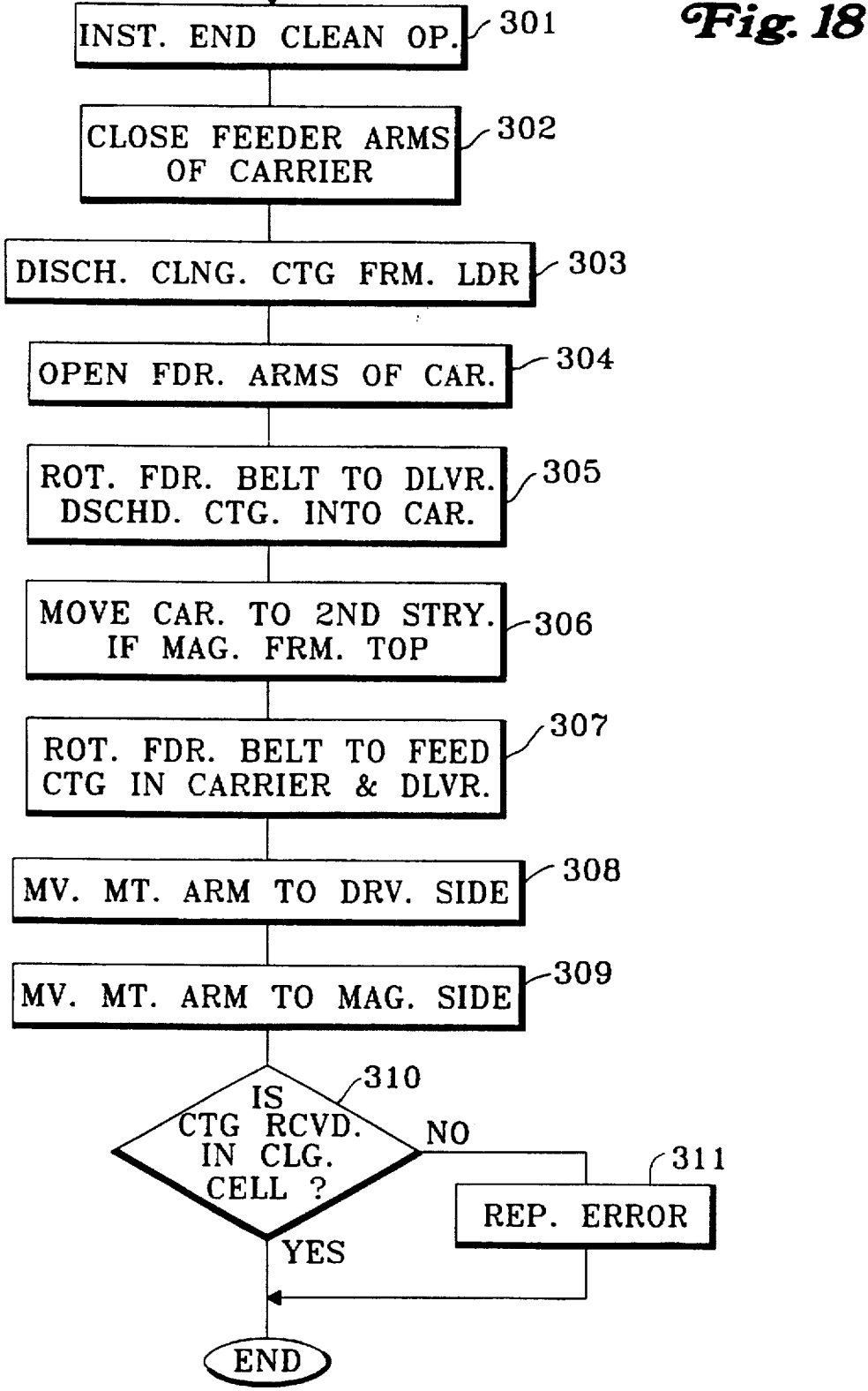
FIG. 18 is a flow chart of the automatic cleaning mode.

Next, the steps of the automatic cleaning mode will be described with reference to flow charts of FIGS. 17 and 18. When instructions for staring a cleaning action come from the host device 184 (see FIG. 16) in Step 201, the feeder arms 134 of the carrier portion 20 are opened in Step 202, in order to move the carrier portion 20 in a vertical direction.

Then in Step 203, the carrier portion 20 is moved to the location of the slot #2 of the magazine 8 corresponding to the cleaning cell 24. In Step 204, the feeder arms 134 of the carrier portion 20 are closed in order to feed the cleaning cartridge.

In Step 205, the mount arm 132 of the carrier portion 20 is moved to the cleaning cell 24 side (main body 4 side) and stopped at the location of the sensor 150. As a consequence, the end portion of the mount arm 132 on the cleaning cell side pushes in the cleaning cartridge housed within the cleaning cell 24, and the cleaning cartridge is released and pushed out of the cleaning cell 24 through the functions of the cleaning cell 24 as previously described.

In Step 206, the mount arm 132 of the carrier portion 20 is moved to the magazine 8 side and stopped at the location of the sensor 148.

In Step 207, the sensor 124 detects whether or not the cleaning cartridge has been discharged from the cleaning cell 24. If the judgement result is affirmative, the procedure proceeds to Step 208 where the feeder arms 134 of the carrier portion 20 are opened.

Subsequently, in Step 209, the drive roller 136 is rotated to being the cleaning cartridge, which has been released out of the cleaning cell 24, back into the carrier portion 20 as shown by an arrow A of FIG. 14.

In Step 210, the carrier portion 20 is moved to a position adjacent to the loader 126 of the main body 4 as shown by an arrow B of FIG. 14. In Step 211, the cleaning cartridge in the carrier portion 20 is fed into the main body 4 as shown by an arrow C of FIG. 14 in accordance with the rotation of the drive rollers 136. Subsequently, in Step 212, the mount arm 132 of the carrier portion 20 is moved to the main body 4 side and stepped at the location of the sensor 150. This completes the feeding of the cleaning cartridge into the main body.

In Step 213, the mount arm 132 is moved to the magazine 8 side and stopped at the location of the sensor 148.

In Step 214, it is judged by the sensor 128, etc. whether or not the cartridge, which has been fed to the main body 4, is a regular cleaning cartridge. If the judgement result is affirmative, the procedure proceeds to Step 215 where the procedure for cleaning the recording/reproducing head is started.

If it is detected in Step 207 that no cleaning cartridge has been discharged from the cleaning cell 24 or if it is judged in Step 214 that the cartridge, which has been fed to the main body 4, is not a regular cleaning cartridge, the procedure proceeds to Step 216 where an error report is sent to the host device 184.

The operation after the completion of the cleaning procedure will now be described with reference to FIG. 18. Upon issuance of instructions concerning the completion of the cleaning procedure by the host device 184 in Step 301, the feeder arms 134 of the carrier portion 20 are closed in Step 302.

The cleaning cartridge is discharged from the loader 126 of the main body 4 in Step 303.

In Step 304, the feeder arms 134 are opened in order to engage the cleaning cartridge 6', which has been discharged from the main body 4, by the carrier portion 20.

In Step 305, the drive rollers 136 are rotated so that the cleaning cartridge, which has been discharged from the main body 4, is brought into the carrier portion 20 as shown by an arrow D of FIG. 13.

In Step 306, the carrier portion 20 is moved to the location of the slot #2 of the magazine 8 corresponding to the cleaning cell 24 as indicated by an arrow E of FIG. 13.

In Step 307, the drive rollers 136 are rotated so that the cleaning cartridge in the carrier portion 20 is inserted into the cleaning cell 24. Then in Step 308, the mount arm 132 is moved to the cleaning cell 24 side and stopped at the location of the sensor 150. The action of the mount arm pushes the cleaning cartridge 6' into the cleaning cell 24.

In Step 309, the mount arm 132 is moved to the magazine 8 side and stopped at the location of the sensor 148.

In Step 310, the sensor 124 detects whether or not the cleaning cartridge 6' is received in the cleaning cell 24. If the detection result of Step 310 is affirmative, the automatic cleaning mode is finished. In contrast, if the detection result of Step 310 is negative, an error report is sent to the host device in Step 311 and then the automatic cleaning mode is finished.

The scope of the invention is not limited to the specific embodiments described above. Those skilled in the art will appreciate that various modification are within the scope of the present invention. The appended claim and their legal equivalents will assist understanding of the scope of the present invention.

We claim:

1. A storage device having a cartridge auto loader for removing and replacing cartridges stored in a magazine and for introducing the cartridges into a main body of said storage device, said main body containing a recording/reproducing device, said storage device comprising:

a housing located adjacent to said main body, said main body being external from said housing;

a door which can be opened and closed relative to said housing;

a magazine tray having a tray portion on which said magazine is placed, said magazine tray being slidable relative to a bottom portion of said housing between a first position where said tray portion is inside said housing when said door is closed and a second position where said tray portion is outside said housing when said door is open;

a cleaning cell for housing a cleaning cartridge used for cleaning a recording/reproducing head of said main body, wherein said cleaning cell is separate from both said magazine and said magazine tray, wherein said magazine is independently movable relative to said cleaning cell;

a carrier portion for transferring said cleaning cartridge between said main body and said cleaning cell and transferring said cartridges between said magazine and said main body; and an elevator means for moving said carrier portion in a stacking-up direction of said cartridges in said magazine.

2. A storage device according to claim 1, in which said stacking-up direction of said cartridges stored in said magazine is vertical.

3. A storage device according to claim 1, in which said cleaning cell includes:

a block movable in response to a movement of said cleaning cartridge which has been introduced into said cleaning cell by said carrier portion;

bias means for biasing said block toward said cleaning cartridge which has been introduced;

latch means for latching said block against the biasing force of said bias means when said cleaning cartridge is stored in said cleaning cell; and a cell door which is opened and closed in operative connection with said block.

4. A storage device according to claim 1, further comprising:

means for biasing said magazine tray from said first position to said second position; and means for latching said magazine tray in said first position.

5. A storage device according to claim 4, further comprising damper means for smoothing the movement of said magazine tray between said first position and said second position.

6. A storage device according to claim 1, in which said elevator means includes:

a drive pulley and a driven pulley disposed in and along a direction of movement of said carrier portion;

an endless belt trained over said drive pulley and said driven pulley;

a base member for mounting said carrier portion, said carrier portion being fixed to said endless belt; and drive means for driving said drive pulley.

7. A storage device according to claim 6, said drive means including:

a motor;

means for transmitting a driving force of a rotary shaft of said motor to said drive pulley;

a driven shaft disposed in parallel with said rotary shaft; and wherein said endless belt is formed of an elastic body trained over said rotary shaft and over said driven shaft.

8. A storage device according to claim 1 wherein said magazine is stationary when said carrier portion is transferring one of said cleaning cartridge and said cartridge.

9. An automatic cleaning method for use in a storage device having a cartridge auto loader for removing and replacing cartridges stored in a magazine and introducing the cartridges into a main body of the storage device, said storage device comprising:

a housing located adjacent to said main body;

a door which can be opened and closed relative to said housing;

a magazine tray having a tray portion on which said magazine is placed, said magazine tray being slidable relative to a bottom portion of said housing between a first position where said tray portion is inside said housing when said door is closed and a second position where said tray portion is outside said housing when said door is open;

a cleaning cell separate from said magazine for housing a cleaning cartridge used for cleaning a recording/reproducing head of said main body;

a carrier portion, separate from said main body, for transferring said cleaning cartridge among said magazine, said main body and said cleaning cell; and an elevator means for moving said carrier portion in a stacking-up direction of said cartridges in said magazine, said automatic cleaning method comprising:

a first step of moving said carrier portion to a position adjacent to said cleaning cell;

a second step of moving said cleaning cartridge from said cleaning cell to said carrier portion;

a third step of detecting said cleaning cartridge which has been discharged from said cleaning cell;

a fourth step of moving said carrier portion to a position corresponding to a cartridge inlet port of said main body when said cleaning cartridge has been discharged from said cleaning cell;

a fifth step of moving said cleaning cartridge from said carrier portion into said main body;

a sixth step of judging whether or not said cleaning cartridge, which has been moved into said main body, is a cleaning cartridge;

a seventh step of executing the cleaning of said recording/reproducing head when it is judged in said sixth step that said cleaning cartridge, which has been moved into said main body, is a cleaning cartridge;

an eighth step of moving said cleaning cartridge from inside main body to said carrier portion;

a ninth step of moving said carrier portion to a position adjacent to said cleaning cell;

a tenth step of moving said cleaning cartridge from said carrier portion to said cleaning cell; and an eleventh step of detecting said cleaning cartridge which has been moved into said cleaning cell, an error report being sent to a host device when it is not detected in said third step that said cleaning cartridge has been discharged from said cleaning cell, or when it is judged in said sixth step that said cleaning cartridge, which has been moved into said main body, is not a cleaning cartridge, or when it is not detected in said eleventh step that said cleaning cartridge has been received in said cleaning cell.

10. A storage device having a cartridge auto loader for removing and replacing cartridges stored in a magazine and for introducing the cartridges into a main body of said storage device, said main body containing a recording/reproducing device, said storage device comprising:

a housing located adjacent to said main body, said main body being external from said housing;

a magazine supporting portion provided in said housing;

a power source unit mounted on said main body of said storage device;

a cleaning cell for housing a cleaning cartridge used for cleaning a recording/reproducing head of said main body, wherein said cleaning cell is separate from both said magazine and said magazine supporting portion, said cleaning cell being provided between said housing and said power source unit and above said main body of said storage device, wherein said magazine is independently movable relative to said cleaning cell;

a carrier portion provided in said housing for transferring said cartridges between said magazine and said main body and transferring said cleaning cartridge between said cleaning cell and said main body; and an elevator for moving said carrier portion in a stacking-up direction of said cartridges in said magazine.

11. A storage device according to claim 10, in which said stacking-up direction of said cartridges stored in said magazine is vertical.

12. A storage device according to claim 10, in which said cleaning cell includes:

a block movable in response to a movement of said cleaning cartridge which has been introduced into said cleaning cell by said carrier portion;

bias means for biasing said block toward said cleaning cartridge which has been introduced;

latch means for latching said block against the biasing force of said bias means when said cleaning cartridge is stored in said cleaning cell; and a cell door which is opened and closed in operative connection with said block.

13. A storage device according to claim 10, further comprising:

means for biasing said magazine supporting portion from a first position to a second position; and means for latching said magazine supporting portion in said first position.

* * * * *